United States Patent
Minakami et al.

[11] Patent Number: 5,433,554
[45] Date of Patent: Jul. 18, 1995

[54] SALT CONCENTRATION GRADIENT FISHWAY

[76] Inventors: Hiroyuki Minakami, 2-1-1 #109 Nishi Okamoto Higashinada-Ku, Kobe, 658 Hyogo Prefecture; Motoyuki Minakami, 1-6-16 Agenogi Matue, 690 Shimane Prefecture, both of Japan

[21] Appl. No.: 285,829

[22] Filed: Aug. 4, 1994

[30] Foreign Application Priority Data

Sep. 3, 1993 [JP] Japan ................... 5-253542

[51] Int. Cl.⁶ .................................................. E02B 8/08
[52] U.S. Cl. ...................................... 405/81; 119/219
[58] Field of Search ......................... 405/52, 80, 81, 82, 405/87, 92, 118; 137/92, 93; 119/215, 219, 220

[56] References Cited

U.S. PATENT DOCUMENTS

| | | | |
|---|---|---|---|
| 3,096,600 | 7/1963 | Gwyther | 405/81 |
| 3,232,060 | 2/1966 | Windle . | |
| 3,962,876 | 7/1974 | Philips . | |
| 4,260,286 | 4/1981 | Buchanan et al. . | |
| 4,437,431 | 3/1984 | Koch | 405/81 |
| 4,629,361 | 12/1986 | Zimmerman | 405/81 |
| 4,740,105 | 4/1988 | Wollander | 405/81 |
| 5,139,364 | 8/1992 | Arakeda et al. . | |
| 5,161,913 | 1/1992 | Boylan | 405/81 |

OTHER PUBLICATIONS

"Physiology of Fish Recurrent Migration" by Dr. Ueda, contained in *Biology of Migrating Fish*, edited by Drs. Morisawa, Aida and Hirano, Gakkai Press Center Co., Ltd., 1987, pp. 172-180.

*Primary Examiner*—Randolph A. Reese
*Assistant Examiner*—Frederick L. Lagman
*Attorney, Agent, or Firm*—Limbach & Limbach

[57] ABSTRACT

The gradient salt concentration fishway is installed on or near the river bank, at points contiguous to existing flood control dams and weirs. Fresh water flows naturally downstream via the fish way. Salt water is pumped from the sea into several points in the fish way in order to mix with the fresh water of the river. By controlling the amount of salt water introduced at each stage of the fishway, the concentration of salt within the entire fishway can be made gradient. Hence, the concentration of salt nearest the ocean is the greatest while it decreases the closer it gets to the fresh water. Above the dam, the fresh water is not mixed with salt water. This system will more accurately approximate the natural conditions encountered by fish entering a brackish environment, thus easing the biological adjustments which migrating fish need.

8 Claims, 2 Drawing Sheets

SALT CONCENTRATION GRADIENT FISHWAY

BACKGROUND OF THE INVENTION

1. Field of the Invention

The present invention is related generally to fishways, and in particular to a fishway positioned between a river mouth and a point upstream along the river and in which a salt concentration gradient is created so as to more accurately simulate the transition between salt water and fresh water normally encountered by fish which are migrating to their spawning grounds.

2. Description of the Prior Art

As the world's population expands, mankind has increasingly sought to control more of the sources of fresh water to meet its needs for residential, industrial and agricultural purposes as well as for flood control. The means for taking charge over naturally flowing rivers has been to construct dams, weirs and other man-made obstacles. These barriers have not been helpful for the ecosystem of fish.

The construction of dams, weirs and any man-made obstacles at river mouths presents two challenges for the passage of fish upstream or downstream. The first is the obvious physical barrier preventing the passage of fish. The second challenge is less apparent, but nonetheless daunting. This problem is caused by the sudden change in the salt concentration between salt water and fresh water.

The most common solution to the first problem is to install a fishway that allows the fish to traverse the obstacle. This is built in a low slope which eases their passage. Regulating the water flow also assists the fish.

Up to this point, the second problem has not been solved. In a pristine river environment, brackish water is formed naturally where the river meets the body of water into which it drains. The water at this point is a fluctuating mix of fresh water and salt water and can be affected by the tides. Fish, such as salmon, need to adapt to the difference fresh water and salt water makes on their bodies. Also, brackish water helps to give each river its distinct smell. It is commonly known that some migratory fish memorize the smell of the river in which they were born.

Migratory fish are born upstream and then go to sea until they are adult fish. When they spawn, they return upstream to the general area in which they were born. The introduction of a man-made structure causes the elimination of the brackish water. With the loss of the distinct smell, many fish will not be able to find their way back. If they do make it back to the river, the fish can be deterred from swimming upstream because of the sudden and drastic change in the concentration of salt.

Future fishways need to not only consider the ladder gaps, but to take into consideration in their design the gradation of the salt concentration and the smell that occurs in a river's original features.

Information about the state of the fishway art is provided in the following: U.S. Pat. No. 5,139,364 to Arakeda et al.; U.S. Pat. No. 4,629,361 to Zimmerman; U.S. Pat. No. 4,437,431 to Koch; U.S. Pat. No. 4,260,286 to Buchanan et al.; U.S. Pat. No. 3,962,876 to Phillips; U.S. Pat. No. 3,232,060 to Windle; and Kazuo Ueda, "Physiology of Fish Recurrent Migration," Gakkai Press Center, pp. 172-180, 1987.

SUMMARY OF THE INVENTION

To solve the problems described above, this invention incorporates into the design of the contemporary fishway new elements that account for the gap in salt concentration between the salt water at the bottom and the fresh water at the top of the fishway. A fishway or fish ladder is installed as usual next to a dam or other construct. Pumps are then installed which inject salt water via outlets placed within the fishway. Since salt water is introduced at several points along the fishway, the ratio of salt to fresh water can be controlled to increase in the downstream direction. The volume of water pumped is monitored by sensors, this assures that the new man-made environment adheres as closely as possible to the salt gradient of brackish water. The invention usually is installed parallel to the river, however that is not absolutely necessary.

DETAILED DESCRIPTION

Figure 1:
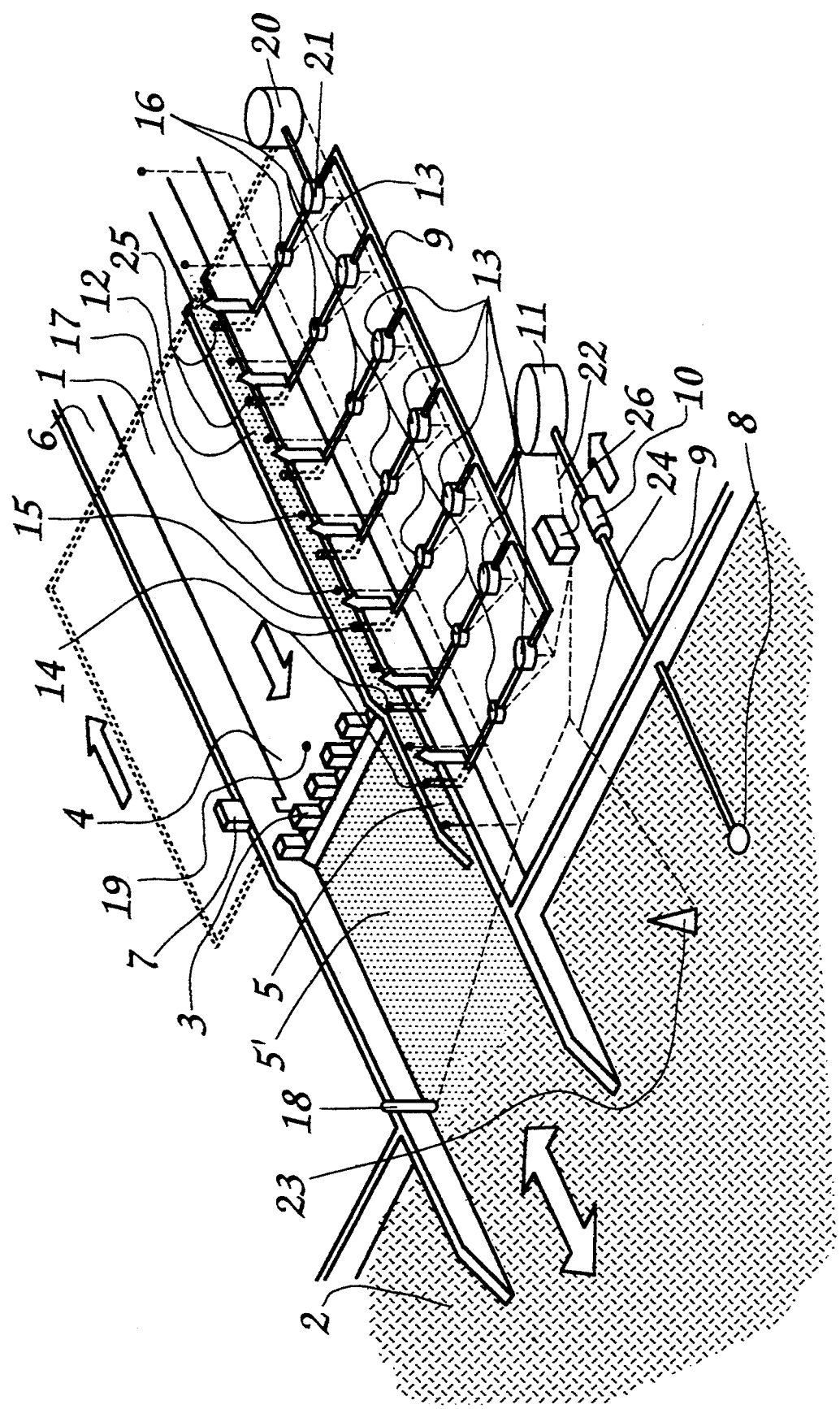
FIG. 1 illustrates a bird's-eye view of one embodiment of the fishway of the present invent ion.

The upstream entrance to the gradient salt concentration fishway abuts the river at any point higher than the dam or barrier around which it is installed. The downstream mouth of the fishway will let out either into the river or directly into the ocean. Water pumped into the fishway should not be diluted by water taken from above the dam. Therefore, the intake apparatus for the salt water pump should be installed directly into the ocean. To minimize the amount of energy necessary for raising such a large volume of water, it is required that the intake apparatus be placed as close as possible to the fishway.

The water pumped from the ocean is raised up to the point of pouring into the fishway through the salt water pipeline. The pumped up salt water is distributed throughout the fishway appropriately. In this case, in order to distribute water more accurately as planned, the water might be pumped to a storage tank prior to being distributed. The distribution of the salt water is performed as follows.

1. Collect as much information about the river as possible, such as river's hourly, daily, weekly, monthly, seasonally, yearly flow data (speed, temperature, contents, depth etc.) around the river mouth prior to the installation of river mouth weir.
2. The real time information of the salt water and river water level are measured by the level sensor.
3. The real time information of the flow rate of incoming river water to the fish way is measured by a river water flow meter which is installed in the fishway system.
4. Based upon the data collected in I above, the total salt water flow rate to the fishway is calculated.
5. The distribution rate through the fishway is calculated by the controller, then controlling order signal is given to each pump or valve electronically to mix and make an appropriate salt gradient.

The above procedure recreates salt gradient flow which existed before construction of the river mouth. Based on collected information about the river mouth before construction, and the information about the fishway such as length, diameter and gradient, we are able to make the most appropriate recreation of the salt gradient river.

The distribution ratio or water flow rate of each upper, middle and lower stream also has to be adapted by the controller which has accumulated information on the water flow rate and salt concentration changes. In this case, in order to control the salt concentration, mixing pure salt water with fresh water directly is effective. Pre-mixing salt water and fresh water from the upper side of the weir is also effective. Both methods have merits and demerits, mixing with 100% salt water has an advantage of minimum usage of salt water, however it is more difficult to obtain more precise salt concentration control. The other method mixing with pre-mixed salt water has an advantage of being able to more finely control salt concentration, however, it is more costly because it requires a premixing tank and a more complicated pipeline.

By mixing fresh water taken from the river and the salt water from the ocean throughout the fishway, it is possible to obtain the salt gradient concentration water flow. And, it is possible to obtain the artificial brackish water pond or reservoir, when the pool or pond is installed which is set aside between the upper inlet of fishway and lower fishway outlet. In such a pool or pond, microbes, plants, small animals and any organisms which used be in the river mouth area before the river mouth weir are re-introduced. In this case, the environment of the river mouth area is much closer than in the case of only installing a fishway without pool or pond.

The migratory fish can get back to the mother river by detecting the smell of the river. If the smell of the river is changed by construction of the river mouth weir, the fish will be unable to return to the mother river. If this happens, the population of the fish will decrease. This is why it is very important to recreate the same smell of the river in order to maintain the "coming back" ratio of the fish. This invention presents the way to maintain the smell of the river. Because this invention uses simulated brackish water, a similar smell is produced.

If a weir is constructed, fish, especially migratory fish, will encounter obstacles without a fishway system. Usually, fishways only allow unobstructed fresh water to flow; that is why, even if installed next to the weir, fish are afraid to go up through the present fishway. However, this invention will provide a necessary salt concentration water flow to the fishway, therefore fish will go upstream almost at the same rate as before weir construction.

Referring now in detail, to the drawings. FIG. 1 illustrates a bird's-eye view of the invention fishway, including the river 1, weir 3 and ocean 2. The weir 3, is constructed in the river mouth area. The weir 3, constructed for large water intake for industrial and residential use, creates a fresh water area 4. Just below the weir 3 is the area 5 where fresh water and salt water can mix, according to the tide. This area then becomes the brackish water area. The weir is attached with the dike 6. The fresh water intake mouth 7 must be installed appropriately in order to accommodate industrial and residential water demand. The fishway 12 is installed next to the river.

The salt water-intake mouth 8 is set in the ocean 2. The salt water pipe line 9 is installed from the intake mouth to the salt water-spout outlet mouth. In this case, the salt water is first drawn by the salt water raising pump 10, then the intake water is stored in the storage tank 11, however storing the intake water is not always necessary. If required, the intake salt water might be released to the fishway 12 directly. However, if it is stored in the storage tank 11, it is much easier to control the flow of the fishway, because water will always be available.

The water taken from the mouth 8 is forced by the pump 13 to the salt water outlet 14 which is set in the fishway 12. In the case of a short cut system, the pushing pump 13 can fulfills not only its own role, but also that of raising pump 10.

By doing the procedure explained above, the water in the fishway 12 becomes an appropriate mix of salt and fresh water. All of the water coming into the fishway is controlled by the central information control system, the salt concentration is regulated, and the reverse contamination of salt water to the fresh water area is prevented by installing the slanted fishway 12.

Basically, the weir 3 is constructed to obtain large amounts of fresh water, thus the fresh water area 4 has to be segregated from the artificially made brackish water area. The segregating wall 15 must be carefully installed between the fishway 12 and fresh water area 4. And to obtain the same area of recreated brackish water area as natural blackish water area, the segregating wall 15 has to be long enough.

This invention is not like usual fishways which just ease the gap created by the construction of the weir, but this invention alters the environment of the water in such a way that fish, especially migratory fish, can easily go upstream. This is done by recreating the salt gradient which existed prior to weir construction. Because of this, being able to control precisely the salt content of the water is the most important factor of this invention. Using many water-spouting mouths give the best results. Because the same amount of water is coming out from each spouting mouth, the salt content gradually increases. Thus the pre-construction environment is recreated in the fishway. The spouting mouth can be a splashing type of nozzle to mix the fresh and salt water immediately. Also, regardless of the method chosen, care should be taken so that the salt water does not hit migrating fish directly.

In order to control the flow rate of the salt water, a flow rate controlling system which adjusts each spouting mouth 14 is necessary. The electromagnetic valve 16 and/or pump 13 are utilized to adjust each spouting mouth 14. The environment of the brackish water is constantly changing due to both the tide and the fresh water flow rate of the river 1. The fish going up river are directly affected by the changing environment. The real time environment changes are grasped by collecting data from the tide level sensor 23, the river level sensor 18, the river's flow rate sensor 19, and salt concentration detecting sensor 17. All the information is gathered and sent to the control system 26 through the information transferring cables 24. In this case, the information transferring cables are optic fiber cables, however, for different conditions, any cable can be used as long as the material is appropriate.

The information control system 26 calculates how to control the valve 16 and/or pump 13 flow rate to follow the condition prior to construction, especially the condition of the brackish water area 5 of the weir 3. This recreation is carried out based on all the information collected through the information transferring cables 24 and the basic information regarding the fishway such as length, depth, width and the gradient of the fishway.

Based on the data collected, the amount of salt water that has to be pumped into the pathway 12 of the fishway is determined. The amount of salt water is controlled by the information control system 26 by regulating the amount of water brought in by pump 13 through the regulating signal transferring cables 22 to match the desired calculation.

The concentration of salt in the fishway is detected by the salt sensor 17 and the information of each determined salt concentration is fed back through the information transferring cable 24 to the information control center 26.

The real time information of the salt concentration, which is always changing, is collected by the system described above. Once the central information center collects all the information, the system then calculates the amount of salt which will be needed and can control the salt amount which will be put into the fishway by controlling the amount of salt water. Therefore, the invention can recreate and control the fishway salt concentration as the river used to be. This is a totally new method of putting salt gradient concentration in the fishway artificially. In this fishway, the upper section of the fishway has weaker salt concentration. The brackish water area 5 which is located beside the fishway is not naturally made brackish water area, but is artificially made.

Because the invention can provide an artificially made salt concentration fishway, especially, it contributes to a much higher recovery of migratory fish to the mother river.

The fresh water area 4 must not be contaminated with salt water from the fishway. Care must be taken to carefully analyze the local idiosyncracy of the geology so that an appropriately sloped fishway can be built. In case of unusually high tide and/or a low fishway slope, a fresh water storage tank 20 is installed. Fresh water can then be forced into the fishway preventing salt contamination. The flow rate of the tank is controlled automatically.

If a milder method of introducing the salt gradient is needed, salt water can be used indirectly, i.e. premixed. This method would hold salt water in salt water storage tank 11 and fresh water in fresh water storage tank 20. The water is then mixed in the mixer 21, therefore, the mixed water is introduced into the fishway through the mixed water spouting mouth 25. In this way, fish will not make contact with pure salt water. This method also controls salt concentration more delicately.

In order to mix salt water and fresh water effectively, the baffle 27, which is triangle shaped, is installed in the fishway 12.

Figure 2:
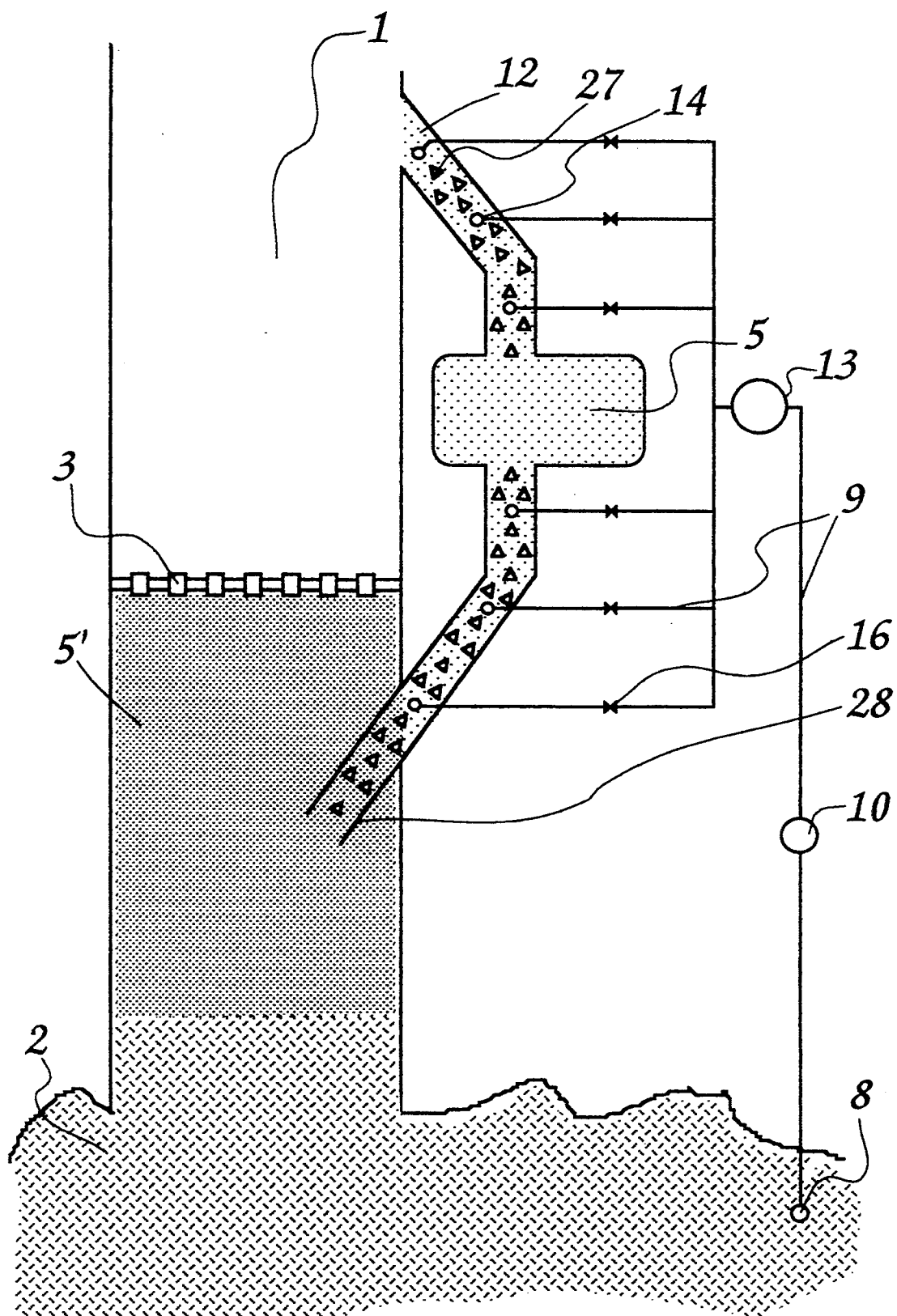
FIG. 2 illustrates a variation of the fishway of the present invention.

In FIG. 2, a variation of this invention is shown. The river 1 flows toward ocean 2. The weir is constructed to obtain fresh water near the river mouth. Downstream from the weir 3 is brackish water area 15. Thus, the fresh water area and the brackish water area 5' are completely segregated by the weir 3.

The salt gradient fishway is installed next to the river as shown in FIG. 2. Also, the brackish water pond 5 is installed in the fishway system. In this case, the pond 5 is installed just in the center of the fishway, however, the location of the pond 5 is not important, the pond can be installed anywhere as long as it is connected to the fishway. In addition, the number of ponds installed can be as many as possible, it is not restricted to just one. The area size of the pond can be any size as long as it is adequate.

The salt water is drawn using the salt water-intake mouth 8 by raising pump 10, then the salt water is directed to storage tank 13 through the pipeline 9. The salt water is then distributed to the fishway 12 to have salt gradient flow in the fishway 12. The salt water flow rate is controlled by electromagnetic regulating valve 16. Finally, the salt water is released into the fishway by the spouting mouth 14. In this particular case, the salt water stored in the storage tank 13 is raised high enough so that a pump is not necessary to distribute the water into the fishway 12. The water is distributed by utilizing the electromagnetic regulating valve 16.

The upstream opening point of the fishway is installed usually just above the weir, however, it is recommended that the upstream opening point be much farther upstream from the weir, even as far as ten miles above the weir. The most important factor is to maintain the total ecological system as it was before construction of the weir. Therefore, the fishway should have enough space to allow for the necessary brackish water area.

The downstream opening point of the fishway is installed usually just below the weir, however, it is recommended that this opening point be placed where fish are most likely to gather, sometimes it can be connected to ocean directly. To avoid altering the environment of the brackish water area 5' with higher concentration of salt water from the fishway, it is recommended that a segregating wall 28 be installed protruding into the river toward the river mouth.

Therefore, many modifications and embodiments of this specific invention will come to mind to one skilled in the art by having the teachings presented in the foregoing description and accompanying drawings of this invention and hence it is to be understood that the invention is not therefore limited and that such modifications, etc., are intended to be included in the scope of the appended claims.

What is claimed is:

1. Apparatus positioned in an area of a mouth of a river which opens into a body of salt water for guiding fish to a point upstream along the river, comprising
   a fishway positioned between the upstream point and the river mouth and through which water can flow from the upstream point to the river mouth;
   a salt water intake mouth positioned with respect to the body of salt water to receive salt water therefrom;
   a salt water pipeline connected to said salt water intake mouth;
   an intake pump connected to said salt water pipeline to pump salt water from the intake mouth and along the salt water pipeline;
   a plurality of salt water outlet mouths coupled to the intake pump and positioned along the fishway to deliver salt water from the saltwater pipeline into the fishway.

2. The apparatus of claim 1 wherein each of the plurality of salt water outlet mouths deliver substantially the same amount of salt water to the fishway.

3. The apparatus of claim 1 further including a salt water holding area coupled to said intake pump into which salt water from the salt water pipeline can flow.

4. The apparatus of claims 1, 2 or 3 further including
   a fresh water intake mouth positioned at a predetermined point along the river;

a fresh water holding area coupled to the fresh water intake mouth and into which fresh water from the fresh water intake mouth can flow;

a mixer coupled to the fresh water holding area and the salt water holding area which stirs together fresh and salt water from the holding areas; and a pushing pump coupled between the mixer and the plurality of salt water outlet mouths which sends stirred water from the mixer into the outlet mouths and into the fishway.

5. The apparatus of claim 4 further including a weir positioned in the river and which restricts the flow of fresh water from the river into the river mouth, and wherein the fresh water intake mouth is positioned upstream of the weir.

6. The apparatus of claim 4, further including a tide level sensor positioned in the body of salt water;

a river level sensor positioned near the mouth of the river;

a salt concentration sensor positioned in the fishway; and an information control system coupled to receive real time information from the tide level, the river level, and the salt concentration sensors, and for controlling the speed and rate of the intake pump and the pushing pump as a function of design parameters of the fishway and the real time information so that a desired salt concentration gradient is obtained through the fishway.

7. The apparatus of claim 4, further including a baffle positioned in the fishway which mixes water flowing through the fishway with water being delivered from the plurality of outlet mouths.

8. The apparatus of claim 1 further including a baffle positioned in the fishway which mixes salt water flowing through the fishway with water being delivered from the plurality of outlet mouths.

* * * * *